(12) United States Patent
Abraham (10) Patent No.: US 7,363,832 B2
(45) Date of Patent: Apr. 29, 2008

(54) TRANSMISSION SYSTEM FOR SCOOTERS (75) Inventor: Joseph Abraham, Maharashtra (IN)

(73) Assignee: Bajaj Auto Limited, Maharashtra (IN)

( * ) Notice: Subject to any disclaimer, the term of this patent is extended or adjusted under 35 U.S.C. 154(b) by 200 days.

(21) Appl. No.: 10/533,201

(22) PCT Filed: Oct. 27, 2003

(86) PCT No.: PCT/IN03/00344

§ 371 (c)(1),
(2), (4) Date: Feb. 14, 2006

(87) PCT Pub. No.: WO2004/039659

PCT Pub. Date: May 13, 2004

(65) Prior Publication Data

US 2006/0124373 A1 Jun. 15, 2006

(30) Foreign Application Priority Data

Oct. 29, 2002 (IN) ............................. 936/MUM/02

(51) Int. Cl.
F16H 3/08 (2006.01)
(52) U.S. Cl. ...................... 74/331; 74/333; 74/473.16; 74/473.3
(58) Field of Classification Search .................. 74/331, 74/333, 473.15, 473.16, 473.3
See application file for complete search history.

(56) References Cited

U.S. PATENT DOCUMENTS 4,331,212 A    5/1982  Tsuboi
4,491,031 A *  1/1985  Ooka ......................... 74/337.5
4,510,820 A *  4/1985  Tsuboi ...................... 74/473.16
4,870,874 A * 10/1989  Ito ............................. 74/665 T
5,038,731 A *  8/1991  Shimada .................. 123/192.2
6,357,545 B1* 3/2002  Hori et al. .................. 180/219
6,948,393 B2* 9/2005  Hori et al. ..................... 74/331
7,021,114 B2* 4/2006  Perreault ....................... 72/402
7,040,454 B2* 5/2006  Kawamoto et al. ......... 184/106
7,174,800 B2* 2/2007  Kawakubo et al. ........ 74/337.5
7,213,674 B2* 5/2007  Maeda et al. ................ 180/364
2005/0081664 A1* 4/2005  Kawakubo et al. ........ 74/337.5

FOREIGN PATENT DOCUMENTS

EP      1 039 171 A2    9/2000

* cited by examiner

Primary Examiner—Ha D. Ho
(74) Attorney, Agent, or Firm—The Webb Law Firm (57) ABSTRACT A transmission system for a scooter has a gear train assembly and a gear shifting mechanism. The gear train assembly has an input shaft, which is provided with an integral gear, an intermediate shaft, an output shaft, an input fork, an intermediate fork, an output fork, three dog gears, four slotted gears, and gear. The system may be employed for manually or automatically changing gears in a scooter to enable the vehicle to be driven with different speeds and with varying load conditions. The system utilizes a compact three-shaft system designed to achieve required gear ratio steps in a positive efficient manner.

8 Claims, 10 Drawing Sheets

TRANSMISSION SYSTEM FOR SCOOTERS

BACKGROUND OF THE INVENTION

1) Field of the Invention

This invention relates to a new transmission system employed for manual or automatically changing the gears in scooters, to enable the vehicle to be driven with different speeds and with varying load conditions. The invention is particularly concerned with a compact three-shaft system, designed to achieve required gear ratio steps in a positive and efficient manner.

2) Description of the Prior Art

Scooters are driven by prime movers like thermal engine working on fuels ie. gasoline, diesel, LPG or can be battery operated. Since the vehicle on road has to negotiate different gradients with varying load conditions and at different speeds, it is provided with either manual or automatic transmission. The present scooter with manual gear—shift transmission consists of gears in constants mesh, which are laid on two shafts, namely clutch shaft and the output shaft on which the rear wheel is mounted. The power flow from crank shaft to clutch shaft is transmitted through a primary gear reduction. In this known system, engine and transmission share the same lubricating oil in case of engines working on four-stroke principle. The shifting is done through cross selector mechanism operated by hand. In case of motor cycles a known two-shaft transmission system is used, namely clutch shaft and output shaft on which output sprocket is mounted and operated by foot. In order to have a 5-speed transmission, it is necessary to have 5 pairs of gears (10 gears) in constant mesh ie. each shaft having 5 gears.

A disadvantage of the present system is that the extreme angular travel of the twist grip in case of scooters is large and at the extreme position, operation of the control switches provided on left side of handle bar is difficult. The difficulty increases further when there is a need to adopt 5 speed gear transmission.

Yet another difficulty in the present system is that in the case of engines working on four stroke principle, same lubrication oil is used for lubricating transmission parts (shaft, clutch gears etc.) and engine parts (piston, camshaft, valves etc.) which is detrimental to the life of engine parts due to tiny wear particles generated in the transmission system.

Yet another disadvantage of conventional system for 4-stroke engine is that the clutch components are lubricated by engine oil which is relatively at higher temperature, which hinders proper functioning of clutch.

One of the object of the present invention is to provide an improved transmission system for the scooter, which is compact in nature and can be accommodated within the rear wheel rim diameter code.

Another object of the present invention is to provide an improved transmission system for scooter in which gear shifting can be achieved through a hand operated or foot operated control system or automatically ie. by, electrical motor, by solenoid actuated electrically/hydraulically/pneumatically.

Yet another object of this invention is to provide less angular travel of the twist grip (when shift mechanism is controlled by hand) with a resetting action easing gear shifting and operation of the control switches provided on left hand side of handle bar.

A still further object of the present invention is to use the same transmission system for different wheel sizes.

Still one more object of the present invention is to provide an improved transmission system for scooters, which can provide for use of separate lubrication oil for engine parts (piston, camshaft, valves etc.) and transmission parts (shaft, clutch gears etc.) for engines working on 4 stroke principle.

SUMMARY OF INVENTION

The present invention provides a compact three shaft system having nine gears in constant mesh (delivering five transmission gear ratio steps), three forks, one drum assembly with three milled profiles on its outer periphery which converts the rotary motion of the drum assembly to sliding motion of the respective forks for selection of appropriate transmission gear ratio. Each profile provided on the drum will move a specific fork to achieve two transmission ratio steps. The precise rotation of the drum assembly is achieved through the shift mechanism, which resets it to its original position after achieving every gearshift. The said shift mechanism can be operated either by hand, ie. twist grip rotation/foot/depressing a gearshift switch (automatic).

The transmission system works in conjunction with the clutch system mounted on the input shaft of the transmission. The clutch system gets the drive from the crank shaft through flexible linkage such as chain, belt, and drive shaft, to accommodate different center distances. This feature in conjunction with the invention can accommodate wide range of transmission ratios to suit different wheel sizes. The transmission and clutch systems are lubricated by transmission oil. By adopting this invention engine oil and transmission oil are separated, which results in increased life of engine components and clutch components.

Another embodiment of this invention is that the number of transmission ratios required can be varied by removing/modifying some components of the system ie. to get four transmission steps, a specific fork, gear can be dispensed from the system without disturbing the functioning of overall system.

Thus the object of the present invention is to have a transmission system which can be housed within the rear wheel rim diameter code of a scooter even by employing different wheel sizes, and to integrate an efficient gear shift mechanism, which can be operated either through hand, foot, or automatically, ie. electrical motor, by solenoid actuated, electrically/hydraulically/pneumatically.

BRIEF DESCRIPTION OF THE DRAWINGS

The present invention will now be described herein below with reference to the drawing accompanying this specification wherein.

DETAILED DESCRIPTION OF THE INVENTION

Figure 1:
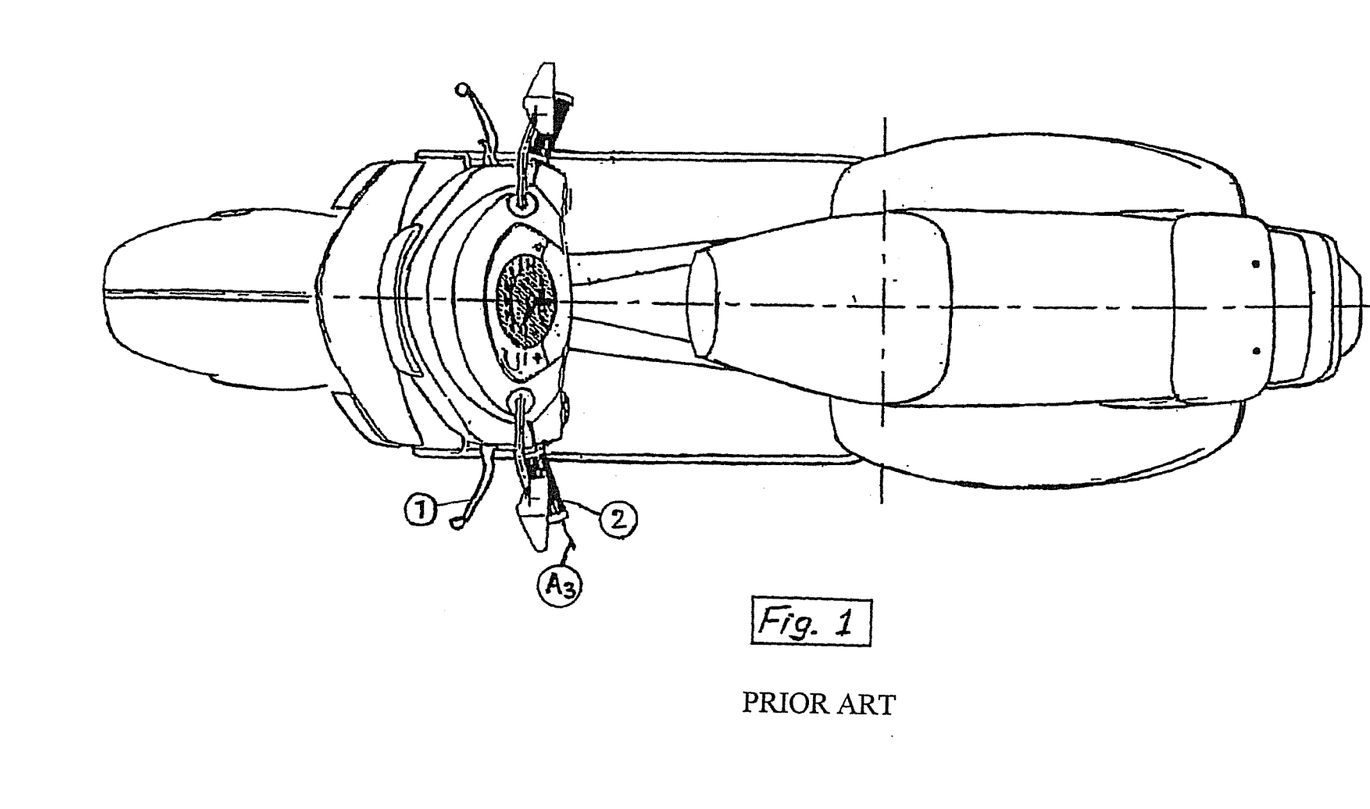
FIG. 1 illustrates the location of hand-operated clutch and gear Shifting mechanism according to the prior art.
Figure 2:
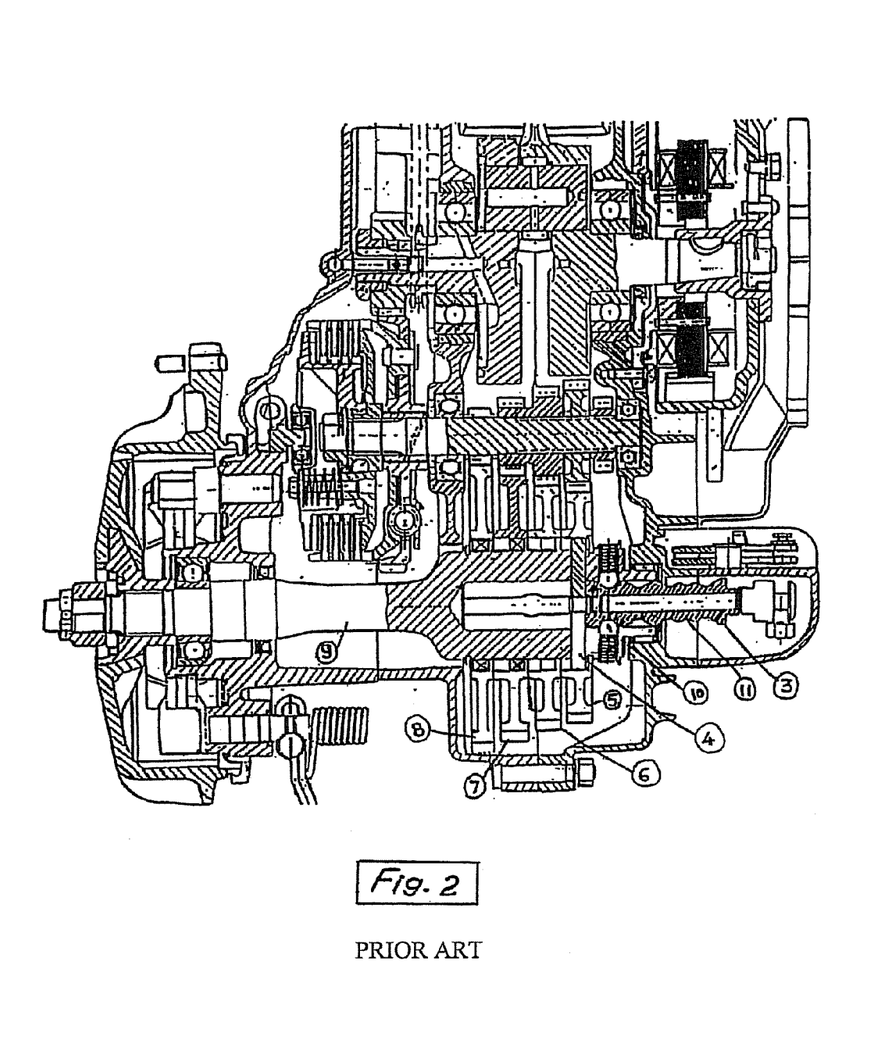
FIG. 2 illustrates the flow of power in hand operated clutch and gear Shifting mechanizing according to the prior art.

With reference to FIGS. 1 and 2, the operation of the clutch is by depressing the lever (1). The clutch is disengaged when lever (1) is depressed and on releasing the lever (1) the clutch is engaged. The gear shifting is achieved by means of rotating the twist grip (2) in a clockwise or counterclockwise direction depending upon the gear to be selected by applying twisting effort on lever (1). The rotation of the twist grip (2) about the axis A3 moves the pin (3) axially, through control cables (not shown). A cross (4) is located inside the main shaft (9) and is attached to other end of the pin (3). Depending upon the angular position of the twist grip (2), the cross will match with one of the gears (5,6,7 or 8) and thus the motion is transmitted to the main shaft (9) on which the rear wheel (not shown) is fitted.

As can be seen in the FIG. 2, if gear (8) needs to be engaged, the pin (3) should be pushed so that cross (4) matches with gear (8). This is achieved by twisting the twist grip (2) with the help of lever (1) in anti-clockwise direction looking from the left side of the vehicle. In this case, the angular position of the twist grip is undesirably high and is very uncomfortable particularly when shifting of gear is desired from gear (8) to gear (7) and to operate the control switches simultaneously. When a particular gear is engaged, the position of the cross (4) needs to be locked till a further shift is made. This is achieved by means of ball (10) and grooves (11) located on the pin (3).

As explained above, the gear shifting control is in conjunction with the clutch control, and the shifting is achieved through rotating the twist grip. The total angular travel of twist grip depends on number of gear ratio steps provided on the vehicle.

Figure 3:
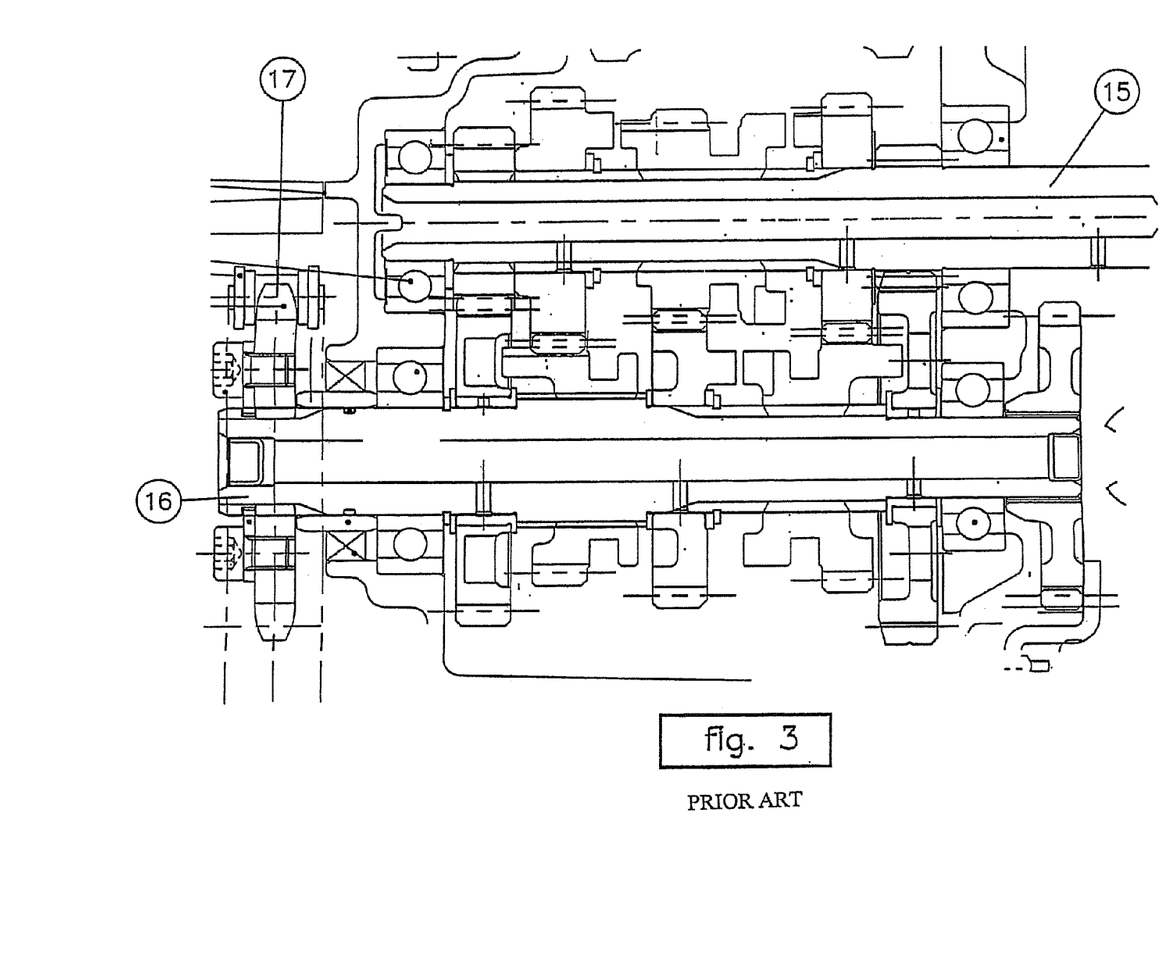
FIG. 3 illustrates another transmission system of the prior art.

With reference to FIG. 3, which illustrates a known two-shaft transmission system used in a motor cycle, namely clutch shaft (15) and output shaft (16) on which output sprocket (17) is mounted. In order to have a 5-speed transmission, it is necessary to have 5 pairs (10 gears) of gear in constant mesh, each shaft having 5 gears.

The transmission system and gear shift system explained as in the prior art are well known and do not require detailed explanation.

The improved transmission system for scooters essentially comprises a gear train assembly and a gear shifting means; said gear shifting means comprising a crank case assembly (34), a sector plate (42), a gear shifting lever assembly (30), a gear shift lever (31) having a slot (32), a pair of lanced projection (36 and 36*a*), an integral bent lug (39 and 39*a*), six numbers of gear shifting pins (35), a drum assembly (37) provided with milled profiles (52, 53, 54) a spring loaded inhibitor (38), stopper pin (33), a compression spring (41) and a torsion spring (40); said gear train assembly comprising an input shaft (43) provided with an integral gear (43*a*), intermediate shaft (44), an output shaft (45), an input fork (46), an intermediate fork (48), an output fork (50), three dog gears (47, 49, 51), four slotted gears (55, 56, 57, 58), and a gear (59);

The improved transmission system for scooters according to this invention is explained in the following paragraphs in three main sections. The first section explaining the transmission gear box and the second section explaining the control mechanism. The third section explains the embodiments of the invention.

Section 1

The improved transmission system for scooters comprises a gear shifting means and a gear train assembly housed in the crankcase assembly (34).

The gear shifting means comprises a gear shifting lever assembly (30) which is fastened to sector plate (42) at one end thereof and a gear shift lever (31) welded at the other end. The sector plate (42) is operated through control means provided either through hand, foot, or automatically, ie. electrical motor, by solenoid actuated, electrically/hydraulically/pneumatically. The gear shifting lever assembly (30) is further connected to crank case assembly (34) through a double acting torsion spring (40). The drum assembly (37) is rotatably fitted in the crank case assembly (34). The gear shifting pin (35) is slidably fitted through splines to the drum assembly (37) against a compression spring (41). The gear shifting pin (35) is operated by the lanced projection (36, 36*a*) and its movement limited by bent lug (39, 39*a*) which are integral on gear shift lever (31). The drum assembly (37) is locked after the desired gear shift by the inhibitor (38) which is spring (66) loaded.

The gear train assembly comprises of a gear (59) and dog gear (47) rotatably fitted on the input shaft (43) with an integral gear (43*a*), slotted gears (55, 56) and dog gear (49) rotatably fitted on the intermediate shaft (44) and slotted gears (57, 58) and dog gear (51) being rotatably fitted on the output shaft (45). The drum assembly (37) is provided with milled profiles (52, 53 and 54) on its outer periphery on which the input fork (46), intermediate fork (48), and output fork (50) are engaged. Once the drum assembly (37) rotates the input fork (46), intermediate fork (48), and output fork (50) are guided along the milled profile and move axially on their respective shafts to slide the dog gears as mentioned below. The other end of said forks (46, 48 and 50) are connected to dog gears (47, 49 and 51) respectively.

Figure 4:
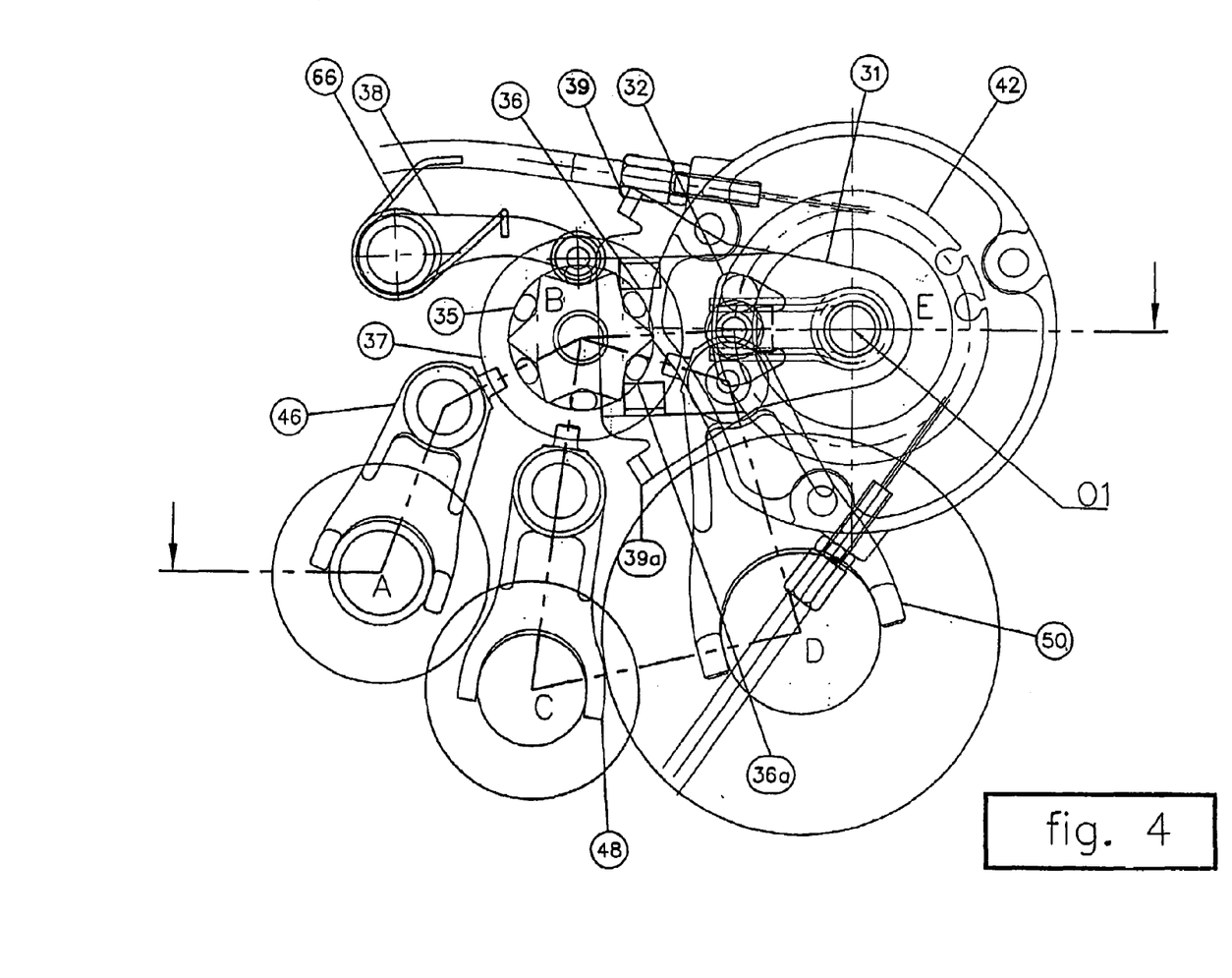
FIG. 4 illustrates the transmission system as per the invention (in Side view).
Figure 5:
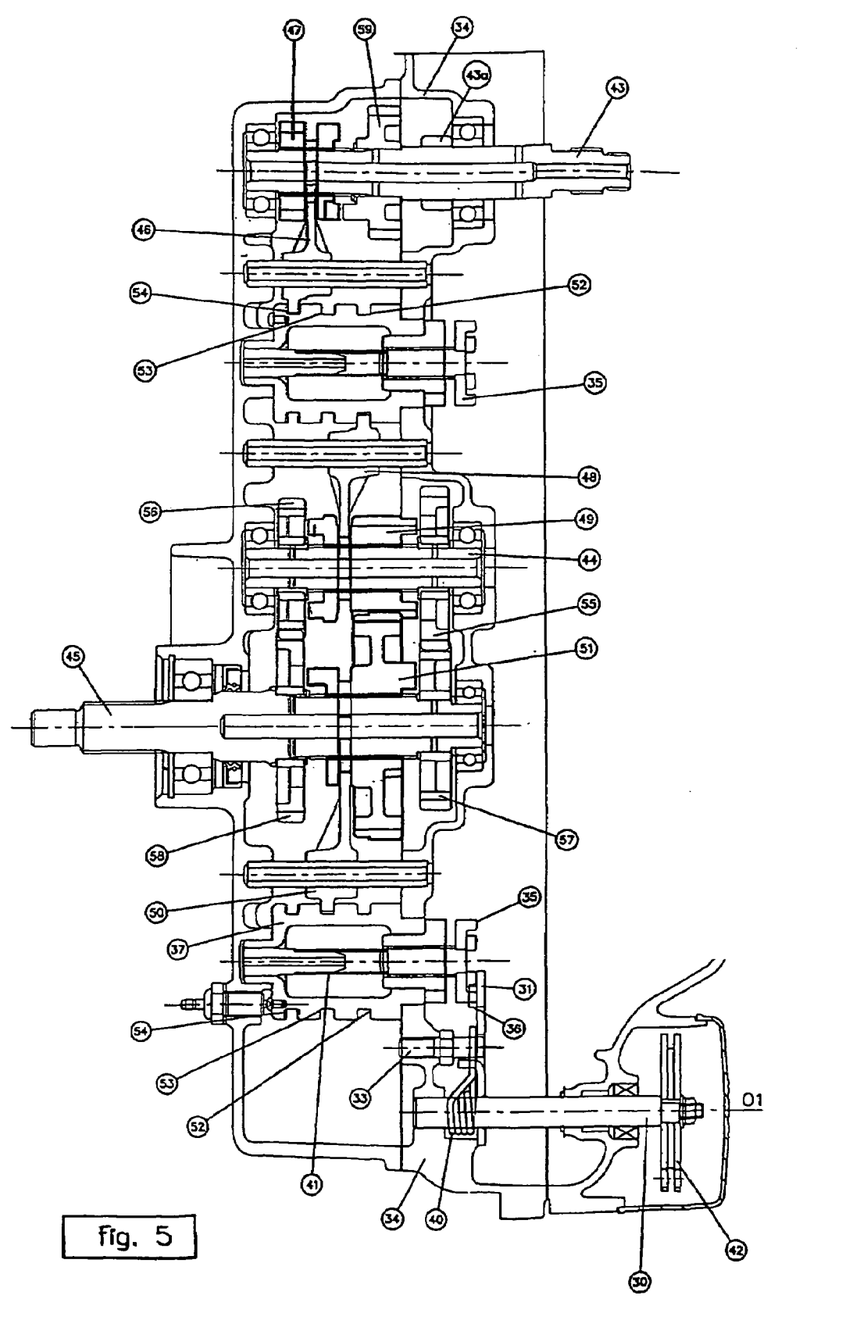
FIG. 5 illustrates the section view ABCDBE of transmission system as shown in FIG. 4.

With reference to FIGS. 4 and 5, the gear shifting mechanism as per the invention comprises of gear shifting lever assembly (30), which can rotate in both the directions about the axis 01. The gearshift lever (31) has a slot (32) to restrict its angular motion in both direction in conjunction with a stopper pin (33) mounted on crankcase assembly (34). The rotary motion of gearshift lever (31) is transmitted to gear shifting pin (35) through lanced projections (36, 36*a*) on the gear shift lever (31).

The gear shifting pin (35) in turn rotates the drum assembly (37) through splines/sliding key. To prevent overshifting of the drum assembly (37), it is locked after every shift using an inhibitor (38), which is spring (66) loaded. In addition to this a bent lug (39, 39*a*) is also provided on gearshift lever (31) to prevent overshifting.

The reset motion of the gear shift lever assembly (30) is achieved by a double acting torsional spring (40) mounted on the gear shift lever assembly (30). While resetting, the cam surface on the gearshift lever (31) pushes the gear shifting pin (35) down to clear itself, and ready for the next shift. The gear shifting pin (35) springs back to normal position with the help of compression spring (41). The rotary motion to the gear shift lever assembly (30) is provided through the sector plate (42) fastened to gear shift lever assembly (30). The sector plate (42) can be operated either by hand/foot through gear shifting cables/linkages. The direction of rotation of gearshift lever assembly (30) determines direction of rotation of drum assembly (37), which determines a specific fork selection for axial travel.

The transmission system, is a compact three shaft system, namely, an input shaft (43), an intermediate shaft (44), an output shaft (45) on which the rear wheel (not shown) is mounted. Each shaft is supported rigidly on bearings.

Figure 6:
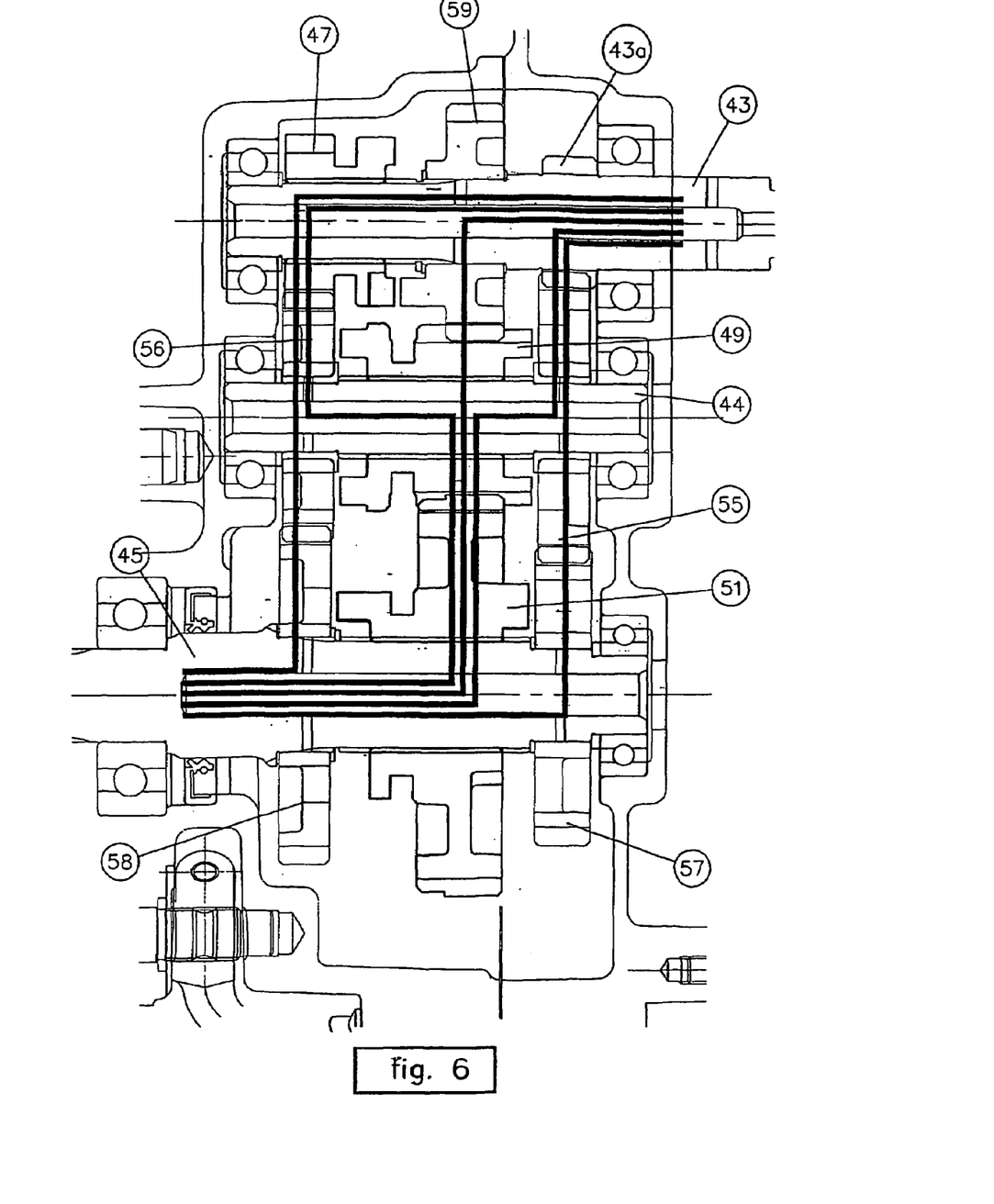
FIG. 6 illustrates the power flow through transmission system as per the invention.

The transmission system comprises of nine gears (three gears on each shaft 43, 44 and 45) in constant mesh as shown in FIG. 6 ie. (43a, 55, 57), (59, 49, 51) and (47, 56, 58). The gears are smaller in size and thereby gears rotational inertias are less. The system is provided with three forks, each one of them moves axially to and fro a specific dog gear on the respective shafts. The forks are designated as input fork (46) which moves dog gear (47) sliding on the splines provided on the input shaft (43), the intermediate fork (48) which moves dog gear (49) sliding on the splines provided on the intermediate shaft (44), the output fork (50) which moves dog gear (51) sliding of the splines provided on the output shaft (45). The drum assembly (37) has three milled profiles (52, 53 and 54). The forks (46, 48 and 50) engage with profiles (54, 52 and 53) respectively on the drum assembly (37).

The power from the crank shaft is given to the input shaft (43) integral with gear (43a) on which clutch (not shown) is mounted through flexible linkage ie. chain or belt or shaft drive.

The five speed transmission system functioning will be explained below with reference to FIGS. 5 and 6.

First gear ratio—To, obtain the first gear ratio, the gearshift lever assembly (30) is rotated in a predetermined direction, which rotates the drum assembly (37). The intermediate fork (48) engaged with the profile (52) on drum assembly (37), moves axially resulting in movement of dog gear (49) which has integral projections (not shown) to clutch side and engaging the slots (not shown) on the slotted gear (55). This completes one gear ratio selection and the shift lever assembly (30) resets to its original position, and the drum assembly (37) is locked after gear ratio selection by inhibitor (38). The power flow in second gear is as below Input shaft (43)-with integral gear (43a)-slotted gear (55)-dog gear (49)-dog gear (51)-output shaft (45).

Second gear ratio—To obtain the second gear ratio, the gearshift lever assembly (30) is rotated in a predetermined direction, which rotates the drum assembly (37). The intermediate fork (48) engaged with the profile (52) on drum assembly (37), moves axially resulting in movement of dog gear (49) which has integral projections (not shown) to wheel side and engaging the slots (not shown) on the slotted gear (56). This completes second gear ratio selection and the shift lever assembly (30) resets to its original position, and the drum assembly (37) is locked after gear ratio selection by inhibitor (38). The power flow in second gear is as below Input shaft (43)-with integral gear (43a)-dog gear (47)-slotted gear (56)-dog gear (49)-dog gear (51)-output shaft (45).

Third gear ratio—To obtain the third gear ratio, the gearshift lever assembly (30) is rotated in a predetermined direction, which rotates the drum assembly (37). The output fork (50) engaged with the profile (53) on drum assembly (37), moves axially resulting in movement of dog gear (51) which has integral projections (not shown) to clutch side and engaging the slots (not shown) on the slotted gear (57). This completes third gear ratio selection and the shift lever assembly (30) resets to its original position, and the drum assembly (37) is locked after gear ratio selection by inhibitor (38). The power flow in third gear is as below Input shaft (43)-with integral gear (43a)-slotted gear (55)-slotted gear (57)-dog gear (51)-output shaft (45).

Fourth gear ratio—To obtain the fourth gear ratio, the gearshift lever assembly (30) is rotated in a predetermined direction, which rotates the drum assembly (37). The output fork (50) engaged with the profile (53) on drum assembly (37), moves axially resulting in movement of dog gear (51) which has integral projections (not shown) to wheel side and engaging the slots (not shown) on the slotted gear (58). This completes fourth gear ratio selection and the shift lever assembly (30) resets to its original position, and the drum assembly (37) is locked after gear ratio selection by inhibitor (38). The power flow in fourth gear is as below Input shaft (43)-with integral gear (43a)-dog gear (47)-slotted gear (56)-slotted gear (58)-dog gear (51)-output shaft (45).

Fifth gear ratio—To obtain the fifth gear ratio, the gearshift lever assembly (30) is rotated in a predetermined direction, which rotates the drum assembly (37): The input fork (46) engaged with the profile (54) on drum assembly (37), moves axially resulting in movement of dog gear (47) which has integral projections (not shown) to clutch side and engaging the slots (not shown) on the gear (59). This completes fifth gear ratio selection and the shift lever assembly (30) resets to its original position, and the drum assembly (37) is locked after gear ratio selection by inhibitor (38). The power flow in fifth gear is as below Input shaft (43)-with integral gear (43a)-dog gear (47)-gear (59)-dog gear (49)-dog gear (51)-output shaft (45).

In the above invention, to obtain a 4-speed transmission gear (59), input fork (46) are dispensed without hampering overall system functioning.

The power from the crankshaft to the input shaft (43) can be given through either a chain or through belt or any other suitable means.

Figure 9:
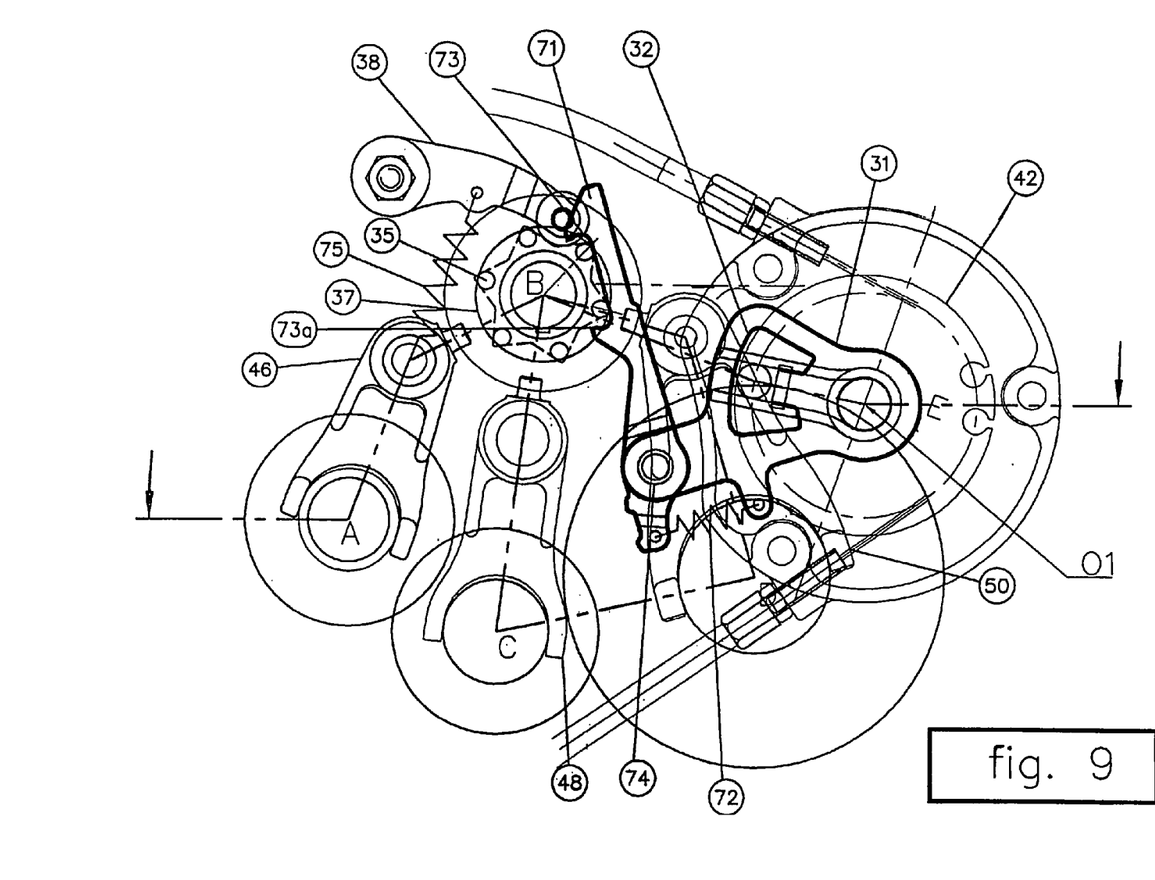
FIG. 9 illustrates another embodiment of the transmission system as per the invention (in side view).
Figure 10:
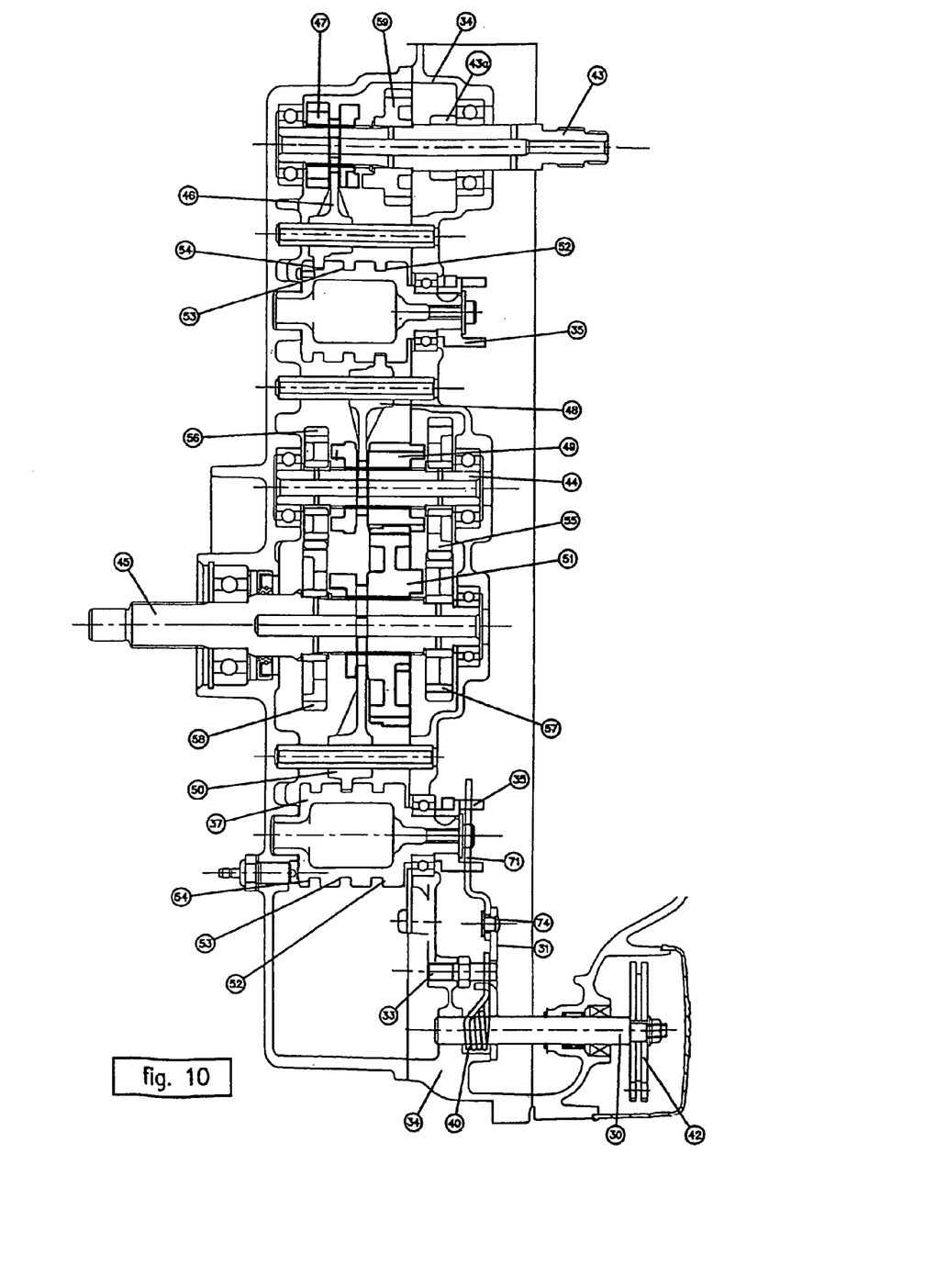
FIG. 10 illustrates the section view ABCDE of transmission system as shown in FIG. 9.

With reference to FIG. 9 and FIG. 10, which illustrate another embodiment of the invention to achieve the rotational motion of the drum assembly (37). As per this embodiment the gearshift lever lever (31) has a slot (32) to restrict its angular motion in both direction in conjunction with a stopper pin (33) mounted on crankcase assembly (34). The gearshift lever (31) is connected to a lever (71) provided with integral projections (73, 73a) by means of a pin (74) and a tension spring (72). As the gearshift lever (31) rotates in a predetermined direction the projections (73, 73a) rotates gear shifting pin (35) and in turn the drum assembly (37). After the desired gear shift is obtained the drum assembly (37) is locked after every shift using an inhibitor (38), which is spring (75) loaded and the lever (71) resets back to its original position and is ready for the next gear shift.

The means of imparting rotational motion to the drum assembly (37) by a lever similar to (71) is known in the case of motorcycles of prior art.

Section 2

Figure 7:
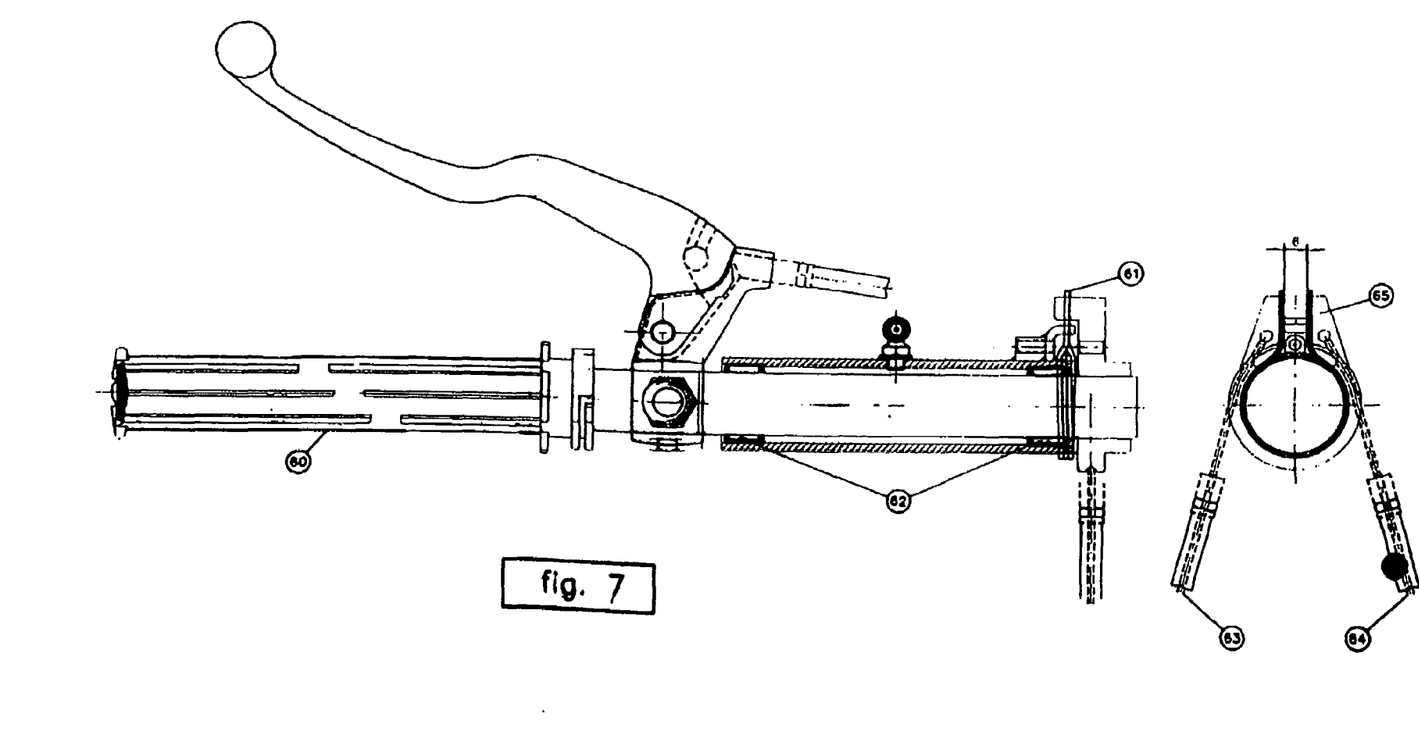
FIG. 7 illustrates shift control system operated by hand.

The rotary motion can be imparted on the sector plate (42) by rotation of the twist grip by hand as shown in FIG. 7. In this invention, the resetting of gearshift lever assembly (30) in turn resets the twist grip (60) to its preset position after every gearshift is achieved. This eases the operation of clutch, control switches namely direction indicator. Invention incorporates additional torsional spring (61), needle roller bearings (62) on the handle bar barrel, to have friction free and positive resetting of the twist grip (60). The number of ratio steps intended would dictate the number of times the twist grip (60) can be rotated in each direction. For example, if intended to have five transmission gear ratios, the twist grip (60) can be rotated in both the directions, each, five times only. The direction of rotation of twist grip (60) determines whether it is upshift or downshift In the above situation, it is five times upshift in one direction and five times downshift in the opposite direction of the twist grip (60). The rotation of the twist grip (60) is transmitted to the sector plate (42) through cables (63 and 64) mounted on gear control link (65).

Section 3

Figure 8:
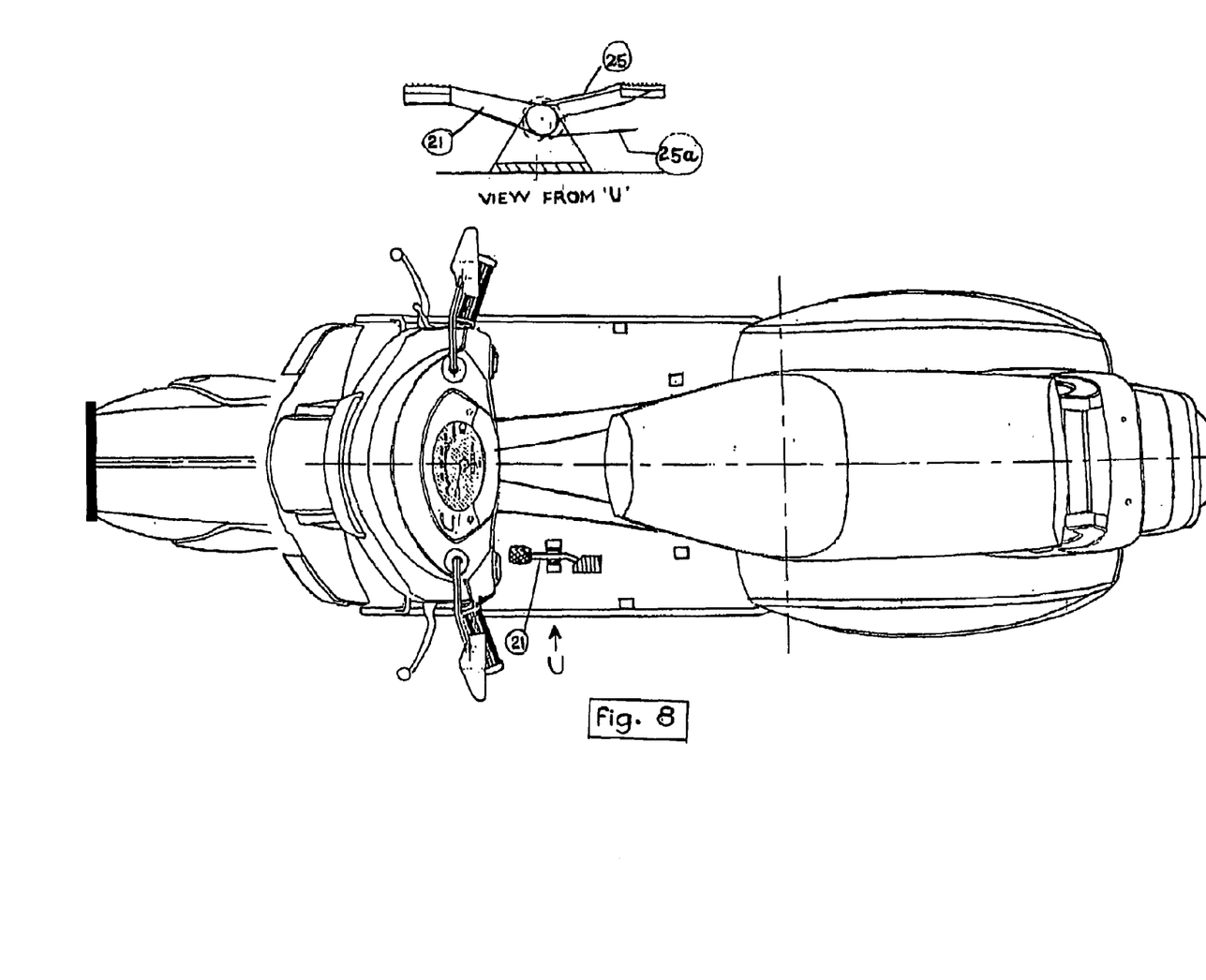
FIG. 8 illustrates shift control system operated by foot.

Alternatively the rotary motion can be imparted on the sector plate (42) by rotation of the lever (21) by foot as shown in FIG. 8. In this invention, the resetting of gearshift lever assembly (30) in turn resets the lever (21) after every gearshift is achieved. The number of ratio steps intended would dictate the number of times the lever (21) can be rotated in each direction. For example, if intended to have five ratio steps, the lever (21) can be rotated in both directions, each, five times only. The direction of rotation of lever (21) determines whether it is upshift or downshift If we take the above case, it is five times upshift in one direction and five times downshift in the opposite direction of the lever (21). The rotation of the lever (21) is transmitted to the sector plate (42) through cables (25 and 25*a*) are alternatively by suitable linkages.

The rotary motion can be imparted on the sector plate (42) with the help of double actuating solenoid, which is actuated electrically, hydraulically or by pneumatic means.

The improved transmission system of the scooter as described herein and as illustrated in the drawings is not exhaustive. Any obvious improvement and/or modification of such transmission system which are within the knowledge of a person skilled in the art are covered by this invention.

I claim:

1. A transmission system for a scooter comprising a gear train assembly and a gear shifting means; said gear train assembly comprising an input shaft provided with an integral gear, an intermediate shaft, an output shaft, an input fork, an intermediate fork, an output fork, three dog gears, four slotted gears, and a gear; said gear shifting means comprising a crank case assembly, a sector plate, a gear shifting lever assembly, a gear shift lever having a slot, a pair of lanced projection, an integral bent lug, six numbers of gear shifting pins, a drum assembly provided with milled profiles, a spring loaded inhibitor, a stopper pin, a compression spring and a torsion spring; said gear shifting lever assembly being fastened to said sector plate at one end thereof and said gear shift lever being welded at the other end, said sector plate being operable through control means provided; said gear shifting lever assembly being connected to said crank case assembly by said torsion spring; said drum assembly being rotatably fitted within said crank case assembly, said gear shifting pins being slidably fitted through splines to said drum assembly by said compression spring, said gear shifting pins being operable by said lanced projection and its movement being limited by said bent lug, said inhibitor being connected to said gear shifting pins through a torsion spring; said input fork, intermediate fork, and output fork being engaged in said milled profiles on said drum assembly; an end of said forks being connected to the dog gears respectively, said gear and first dog gear being rotatably fitted on said input shaft, said first and second slotted gears and second dog gear being rotatably fitted on said intermediate shaft and said third and forth slotted gears and third dog gear being rotatably fitted on said output shaft to achieve the desired gear ratios and resetting said sector plate and said control means back to its normal position.

2. The system for a scooter as claimed in claim 1, wherein said transmission system being spatially located within the wheel rim diameter code.

3. The system as claimed in claim 1, wherein said gear shifting pins being operable by a lever attached to the gear shift lever by a pin.

4. The system as claimed in claim 1, wherein the control means comprises a gear control link which is fitted to a twist grip mounted on needle roller bearings operated by hand; one end of cables is connected to said gear control link and the other end is connected to said sector plate.

5. The system as claimed in claim 1, wherein said control means comprises a lever which is operable by foot, one end of cables is connected to said lever and the other end is connected to said sector plate.

6. The system as claimed in claim 5, wherein said sector plate is operated by means selected from electrical motor or by solenoid or hydraulically or pneumatically.

7. The system as claimed in claim 1, wherein said input shaft gets drive from crank shaft through flexible linkage selected from a group comprising chain, belt, or drive shaft.

8. The system as claimed in claim 1, wherein the number of transmission ratio is three or four.

* * * * *